(12) United States Patent
Chien et al.

(10) Patent No.: US 8,339,524 B2
(45) Date of Patent: Dec. 25, 2012

(54) PROJECTION SYSTEM AND EXPANSION MODULE

(75) Inventors: Wen-Chang Chien, Hsin-Chu (TW); Hung-Lin Lee, Hsin-Chu (TW); Nan-Jiun Yin, Hsin-Chu (TW); Chih-Heng Fan Chiang, Hsin-Chu (TW); Chun-Ping Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 627 days.

(21) Appl. No.: 12/477,890

(22) Filed: Jun. 3, 2009

(65) Prior Publication Data

US 2010/0073581 A1 Mar. 25, 2010

(51) Int. Cl.
*H04N 5/64* (2006.01)
(52) U.S. Cl. ........................................ 348/839; 348/383
(58) Field of Classification Search .................. 348/383, 348/839, 840, 744–749; 710/65; 439/638, 439/540.1, 541.5; 349/5–9
See application file for complete search history.

(56) References Cited

U.S. PATENT DOCUMENTS

| 6,909,406 B2 * | 6/2005 | Wilburn et al. ................ 345/3.1 |
| 6,959,991 B2 | 11/2005 | Ho et al. |
| 7,109,979 B2 | 9/2006 | Moyne et al. |
| 7,259,793 B2 | 8/2007 | Manico et al. |
| 2002/0108108 A1 * | 8/2002 | Akaiwa et al. .................. 725/30 |
| 2005/0280786 A1 * | 12/2005 | Moiroux et al. ............... 353/119 |
| 2006/0146291 A1 * | 7/2006 | Olson et al. ..................... 353/30 |
| 2007/0091435 A1 * | 4/2007 | Garner et al. ................. 359/459 |
| 2007/0105418 A1 | 5/2007 | Fu et al. |
| 2007/0232093 A1 * | 10/2007 | Chang ............................ 439/75 |

FOREIGN PATENT DOCUMENTS

| JP | 2007233028 | 9/2007 |
| TW | M247863 | 10/2004 |
| TW | M254869 | 1/2005 |
| TW | 200508777 | 3/2005 |
| TW | I276906 | 3/2007 |
| TW | 200736797 | 10/2007 |

OTHER PUBLICATIONS

"Office Action of Taiwan Counterpart Application" with English translation thereof, issued on Jun. 11, 2012, p. 1-p. 14.

* cited by examiner

*Primary Examiner* — Brian Glessner
*Assistant Examiner* — Adam Barlow
(74) *Attorney, Agent, or Firm* — Jianq Chyun IP Office

(57) ABSTRACT

A projection system and an expansion module adapted to a projector are provided. The projection system includes a projector and an expansion module. The expansion module includes a housing, a logic circuit, and an output port. The logic circuit is disposed in the housing to control an operation of the expansion module. The output port is disposed in the housing and coupled to the logic circuit. The output port is connected to an input port of the projector and outputs a data stream to the input port, such that the projector generates an image and projects the image according to the data stream.

15 Claims, 10 Drawing Sheets

PROJECTION SYSTEM AND EXPANSION MODULE

CROSS-REFERENCE TO RELATED APPLICATION

This application claims the priority benefit of Taiwan application serial no. 97136350, filed on Sep. 22, 2008. The entirety of the above-mentioned patent application is hereby incorporated by reference herein and made a part of specification.

BACKGROUND OF THE INVENTION

1. Field of the Invention

The present invention generally relates to an expansion module, in particular, to a projection system and an expansion module adapted to a projector.

2. Description of Related Art

Projection devices may project an image onto a large screen to facilitate more people to watch the content displayed on the screen at the same time, and projection devices are applied in public, such as in companies and schools. Further, with the trend that home display products are developed towards the direction of large size, projection devices are gradually popularized in common families, and become a common electronic product in modern life.

Furthermore, with the progress of the technology, various electronic products are developed towards the trend of high speed, high performance, and being light, thin, short, and small. In this trend, portable pico projectors (or mini projectors) have become the mainstream of the personal digital market in the future. Generally, the light source of the pico projector is a light emitting diode (LED) or other solid state light source, so as to improve the total luminance, and improve the brightness of the projected image. After being manufactured into the final product, the size of the battery included in the pico projector is approximately similar to that of the common mobile phones available in the market. The pico projectors are light, thin, short, and small, and are portable, and may be used in any places. Further, it is expected that the battery of the pico projector may provide electrical power for several hours, and therefore when being used for entertainment, the electrical power provided by the battery is enough to meet general demands, for example, watching a DVD movie of about 150 minutes. In business uses, the pico projector may project a picture of 2-100 inches according to the demands of the conference briefing.

For projector manufacturers, especially for original design manufacturer (ODM) plants, there are some inconveniences during the projector development process. FIG. 1 is a flow chart of a projector development process. Referring to FIG. 1, when developing a new type of projector, the manufacturer first carries out a plan proposal for the specification of the new type of projector (Step S10), so as to determine the specification of the projector. Next, relevant persons or customers may evaluate whether the specification of the proposed projector meets the requirements or not (Step S12). If the specification does not meet the requirements or needs to be modified, the specification proposal is rejected to the proposal persons for modification. If the specification meets the requirements, the specification proposal is given to industrial designers (IDs) to perform the appearance design of the projector (Step S14). Then, the relevant persons or customers evaluate whether the designed appearance of the projector is required to be changed or not (Step S16). If the appearance is required to be changed, the original appearance is rejected to the ID for changing. If the appearance is not required to be changed, a mockup may be manufactured according to the designed appearance and the subsequent step of opening mode may be performed (Step S18).

However, after opening mode, if the specification or the appearance design of the projector is required to be changed, an expensive cost should be paid for making the mechanism mold again, so as to be undoubtedly a cost burden for the manufacturer, and reduce the will to change the design.

Further, when buying a projector, a consumer may choose the projector with the suitable input specification and the suitable output specification as a main consideration. In this situation, the appearance of the projector becomes a secondary consideration for purchase instead. Therefore, when being attracted by the appearance of the projector, if the projector does not provide an interface suitable for the consumer's own input/output specification, the consumer may give up the ideal projector to choose the projector with other appearances. For example, FIG. 2 and FIG. 3 show two projectors 50 and 60 having different input port combinations respectively. The input port of the projector 50 includes a universal serial bus (USB) interface 52, a video graphics array (VGA) interface 54, a high-definition multimedia interface (HDMI) 56, an S-video interface 58, and a RCA interface 62. The input port of the projector 60 includes a digital visual interface (DVI) 64, a VGA interface 54, an HDMI 56, an S-video interface 58, and a RCA interface 62. When a consumer chooses a projector (for example, the projector 60) having DVI input interface due to the limit of the display card of the personal computer thereof, if the consumer prefers the appearance of the projector 50 in fact, the consumer may give up purchasing the projector 50 without the DVI input interface. However, the expected sale purpose may not be achieved in such a case for manufacturers who take special appearance or series appearance as the main marketing tactics.

SUMMARY OF THE INVENTION

The present invention is directed to a projection system and an expansion module adapted to a projector. The projection system includes a projector and an expansion module. The expansion module is fixed to the projector in a pluggable manner via an output port of the expansion module, so as to expand the function of the projector and improve the practicability thereof.

Other objects and advantages of the present invention may be further understood from the technical features disclosed in the present invention.

An embodiment of the present invention provides an expansion module adapted to a projector. The expansion module includes a housing, a logic circuit, and an output port. The logic circuit is disposed in the housing and controls an operation of the expansion module. The output port is disposed in the housing and coupled to the logic circuit, the output port is connected to an input port of the projector, and the output port is disposed in the housing of the projector. The output port outputs a first signal to the input port, such that the projector generates an image and projects the image according to the first signal.

Another embodiment of the present invention provides a projection system. The projection system includes a projector and an expansion module. The projector includes a housing and an input port. The input port of the projector is disposed in the housing of the projector. The expansion module includes a housing, a logic circuit, and an output port. The logic circuit is disposed in the housing of the expansion module to control an operation of the expansion module. The output port is disposed in the housing of the expansion module and coupled to the logic circuit. The output port is connected to the input port of the projector and outputs a first signal to the input port, such that the projector generates an image and projects the image according to the first signal. The output port of the expansion module is fixed to the input port of the projector in a pluggable manner.

In an embodiment of the present invention, the output port of the expansion module is selected from the group including a video graphics array (VGA) interface, a digital visual interface (DVI), a universal serial bus (USB) interface, a digital video broadcasting (DVB) interface, and a high-definition multimedia interface (HDMI).

In an embodiment of the present invention, the expansion module further includes an input port adapted to receive a second signal. A specification of the input port of the expansion module is different from a specification of the input port of the projector, and the logic circuit of the expansion module converts the second signal into the first signal.

In an embodiment of the present invention, the expansion module further includes a battery. The battery provides the electrical power for the projector via the output port of the expansion module and the input port of the projector.

In an embodiment of the present invention, the expansion module further includes a charging circuit connected to an external power supply, for charging the battery.

In an embodiment of the present invention, the expansion module further includes a memory card interface connected to a memory card. The logic circuit reads the data stored in the memory card via the memory card interface, and converts the data stored in the memory card into the first signal.

In an embodiment of the present invention, the expansion module further includes an operation interface adapted to be manipulated by a user to change the operation mode of the expansion module.

In the embodiments of the present invention, the user may select an expansion module having a suitable video input interface according to the video output interface of the video device, and connect the expansion module to the projector. Therefore, the projector may be connected with different video output interfaces according to the demands of the user, so as to improve the practicability of the projector.

In the embodiments of the present invention, when the expansion module is fixed on one side of the projector in a pluggable manner via the output port thereof, the expansion module and the projector may be connected without any additional cable, such that both the overall appearance and portability are improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
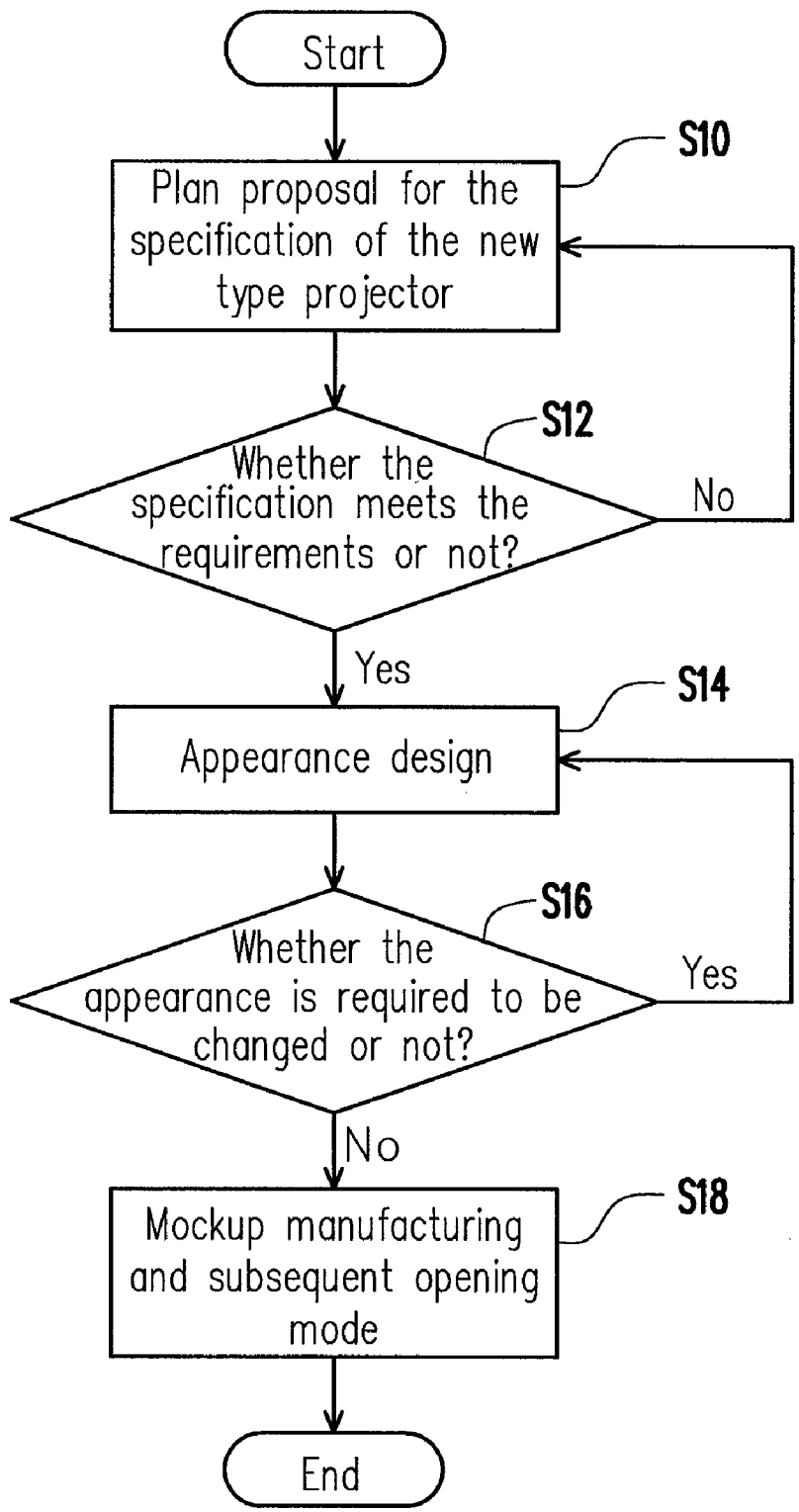
FIG. 1 is a flow chart of a projector development process.
Figure 2:
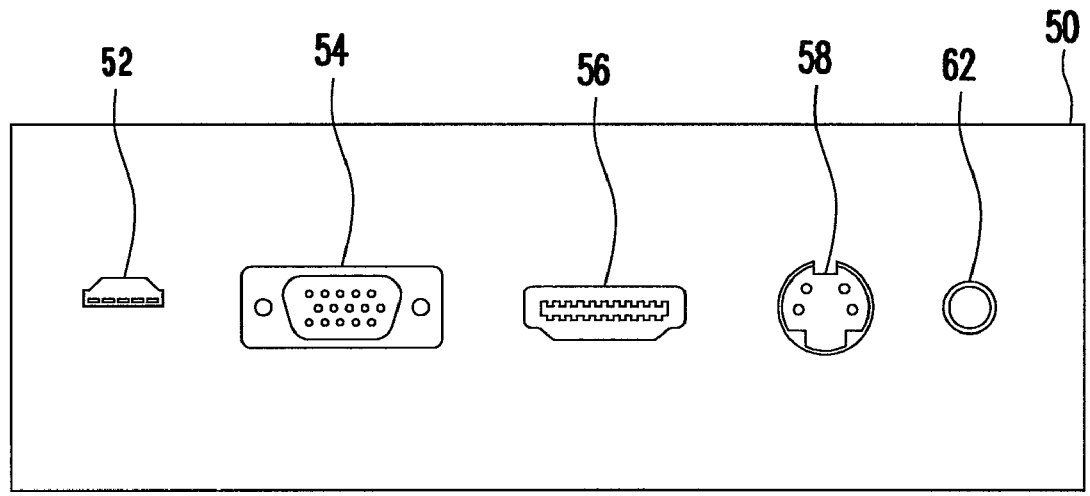
FIGS. 2 and 3 show two projectors having different input port combinations respectively.
Figure 3:
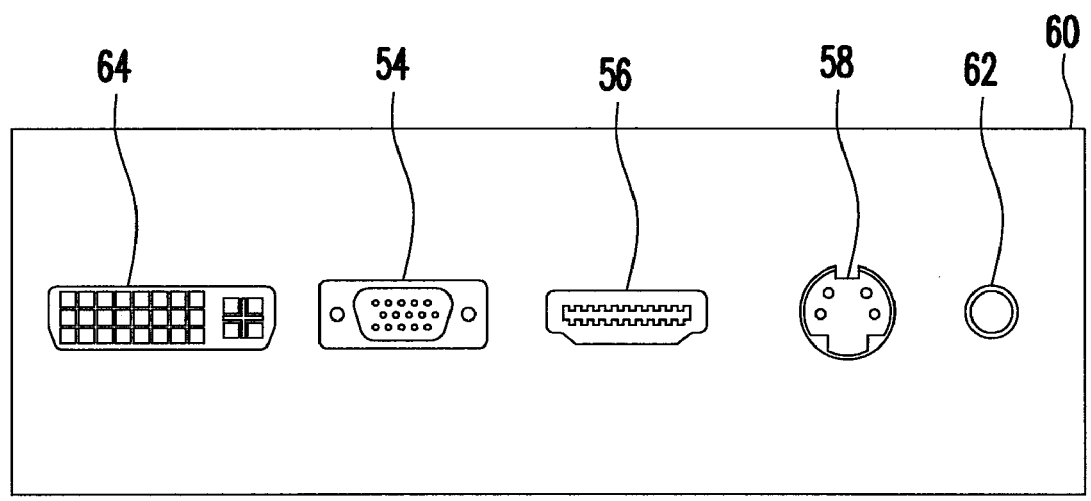
Figure 4:
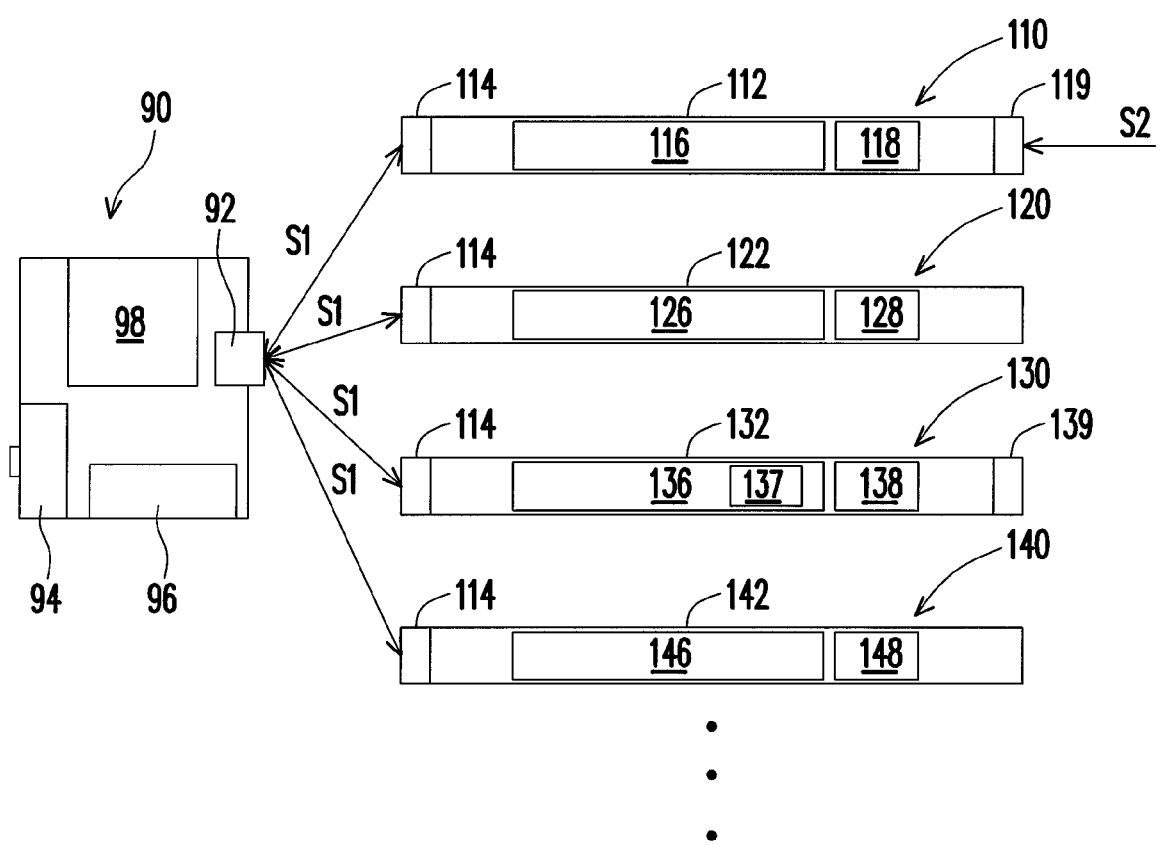
FIG. 4 is a function block diagram of a plurality of expansion modules connected to a pico projector respectively according to an embodiment of the present invention.
Figure 5:
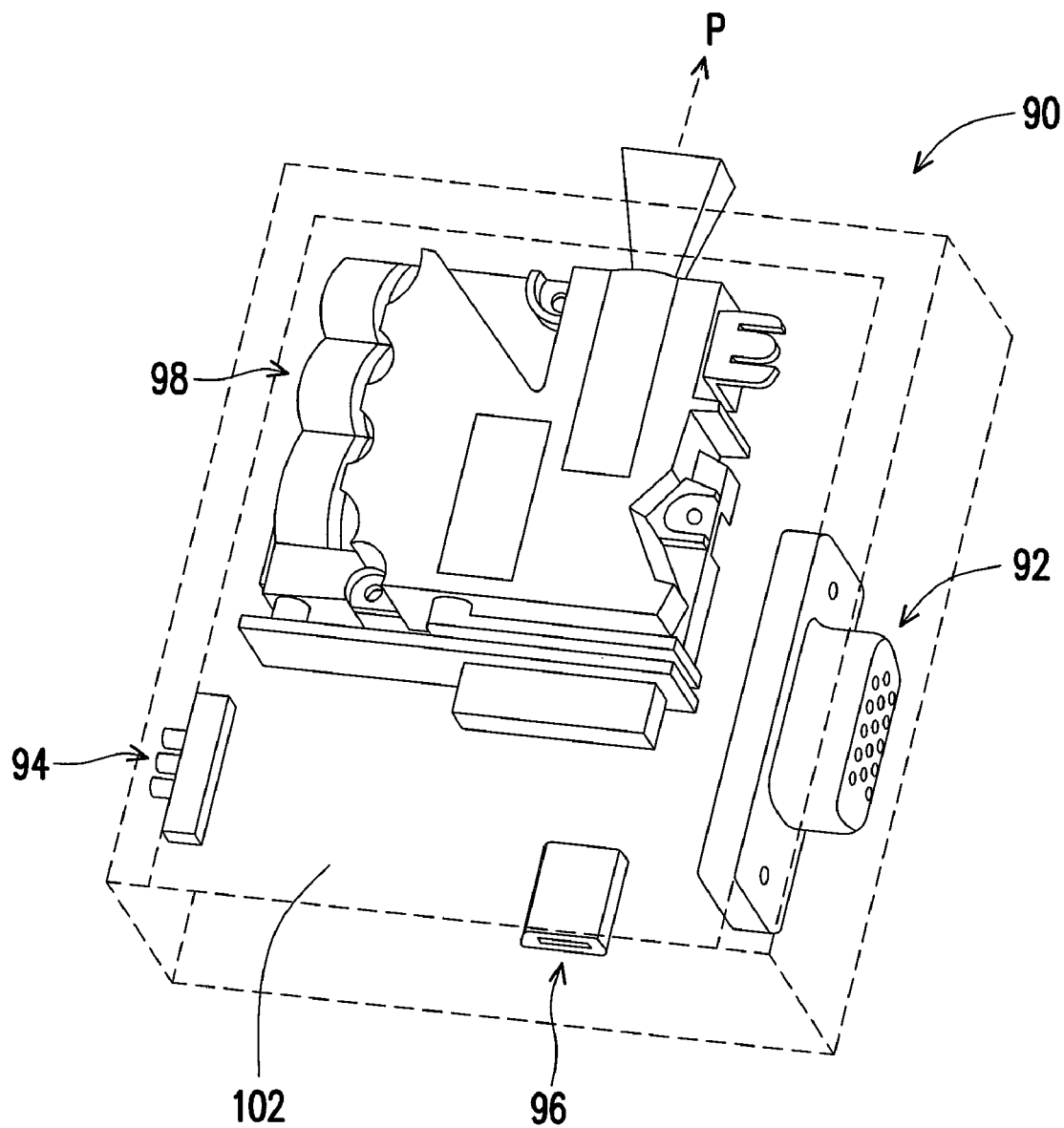
FIG. 5 is a perspective view of the pico projector in FIG. 4.

Referring to FIGS. 4 and 5, FIG. 4 is a function block diagram of a plurality of expansion modules connected to a pico projector 90 respectively according to an embodiment of the present invention, and FIG. 5 is a perspective view of the pico projector 90. As shown in FIG. 4, the plurality of expansion modules include, but not limited to, expansion modules 110, 120, 130, and 140. Each of the expansion modules 110, 120, 130, and 140 has an output port 114 coupled to a first input port 92 of the pico projector 90, for transferring a first signal S1 to the first input port 92. The pico projector 90 includes a housing 102, and the first input port 92 is disposed in the housing 102 of the pico projector 90. In this embodiment of the present invention, the first input port 92 is a VGA interface. However, the present invention is not limited thereto, for example, the first input port 92 may also be a DVI, a USB interface, a DVB interface, and an HDMI.

The pico projector 90 further includes a switch 94, a second input port 96, and an optical engine 98. The switch 94 controls the start-up and shutdown of the pico projector 90 to start or stop the operation of the pico projector 90. The second input port 96 is a signal input port for inputting signal, a power supply input port for inputting electrical power, or an input port for simultaneously inputting signal and electrical power. For example, in an embodiment of the present invention, the second input port 96 is a mini USB interface coupled to a computer or other USB devices, so as to provide electrical power to the pico projector 90 and serve as an interface for transferring data. Further, the optical engine 98 is a component having a circuit, a light valve, projection lens, and a light source (not shown), for converting the video or data from the first input port 92 or the second input port 96 into an image, and projecting the image towards a projection direction P. For example, the optical engine 98 generates an image and projects the image according to a first signal S1 received by the first input port 92. Further, the light source of the optical engine 98 is a set of LEDs or a bulb. In an embodiment of the present invention, the pico projector 90 has the first input port 92 or the second input port 96, that is, in this embodiment, the second input port 96 may be omitted or used to replace the first input port 92. Further, if the first input port 92 and the second input port 96 receive the video simultaneously, the optical engine 98 selects one of the input ports as the video source according to a predetermined priority. For example, in an embodiment of the present invention, the optical engine 98 selects the first input port 92 as the video source, and when the first input port 92 has no signal input, the optical engine 98 selects the second input port 96 as the video source.

Referring to FIG. 4, the expansion modules 110, 120, 130, and 140 each includes a housing 112, 122, 132, or 142, according to the embodiments of the present invention, the shapes and sizes of the housings 112, 122, 132, and 142 may be the same or different. In an embodiment of the present invention, the volume of the housing of the expansion module is a quarter to two times of that of the pico projector 90, thus being convenient for the user to carry about. The output port 114 of the expansion modules 110, 120, 130, and 140 is disposed on one side of the corresponding housing, and any one of the expansion modules 110, 120, 130, and 140 may be fixed on one side of the pico projector 90 in a pluggable manner via the output port 114, thus forming a projection system. For example, a projection system is formed by combining the pico projector 90 and the expansion module 110. In an embodiment of the present invention, each of the expansion modules may further include a fixed mechanism (such as a tenon or a screw), for strengthening the connection of the expansion module and the pico projector. Besides, in this embodiment, the specification of the output port 114 and the specification of the first input port 92 of the pico projector 90 are matched with each other. For example, the output port 114 and the first input port 92 may be VGA interfaces, DVIs, USB interfaces, DVB interfaces, or HDMIs. Furthermore, each of the expansion modules 110, 120, 130, and 140 further includes a logic circuit 116, 126, 136, or 146. The logic circuits 116, 126, 136, and 146 are disposed in the corresponding housings 112, 122, 132, or 142 respectively, and coupled to the corresponding output port 114. The logic circuits 116, 126, 136, and 146 may be formed on a circuit board or an integrated circuit respectively to control the operation of the corresponding expansion module 110, 120, 130, or 140.

The expansion module 110 further has an operation interface 118 and an input port 119. The operation interface 118 may be a touch screen, or one or more buttons, and the user may change the operation mode of the expansion module 110 through the operation interface 118, for example, changing the sampling rate and the image resolution of the logic circuit 116 when processing the signal. The input port 119 receives a second signal S2 and transfers the second signal S2 to the logic circuit 116. The second signal S2 may be an analog video, a digital video, or digital data. The logic circuit 116 converts the second signal S2 into the first signal S1. In this embodiment, the input port 119 of the expansion module 110 may be a VGA interface, a DVI, a USB interface, a DVB interface, or an HDMI. However, it should be noted that, the specification of the input port 119 is different from the specification of the output port 114 and the input port 92.

The expansion module 120 further has a memory card interface 128, connected to a memory card, such as a CompactFlash (CF) card, a Secure Digital (SD) card, or a Memory Stick (MS) card. The logic circuit 126 reads the data stored in the memory card via the memory card interface 128 and converts the data of the memory card into the first signal S1.

The expansion module 130 further includes a battery 138. The battery 138 provides electrical power to the pico projector 90 via the output port 114 of the expansion module 130 and the input port 92 of the pico projector 90. Therefore, the pico projector 90 may be operated when merely being powered by the battery 138. Besides, the logic circuit 136 includes a charging circuit 137, and the expansion module 130 further has a power supply input interface 139. The charging circuit 137 is adapted to be connected to an external power supply through the power supply input interface 139 to charge the battery 138. The charging circuit 137 includes a protection mechanism, so as to prevent overcharging of the battery 138 and damages on the expansion module 130 caused by an instant voltage pulse. The power supply input interface 139 may be an AC/DC transformer, a DC terminal, or a video interface capable of providing electrical power. The video interface capable of providing electrical power includes a VGA interface, a DVI, a USB interface, and an HDMI, described in detail hereinafter.

The expansion module 140 further has a function module 148 coupled to the logic circuit 146. According to the embodiments of the present invention, the function module 148 has one or more of the operation interface 118, the input port 119, the memory card interface 128, the charging circuit 137, the battery 138, and the power supply input interface 139, so as to provide a single function or a composite function. For example, in an embodiment of the present invention, the function module 148 of the expansion module 140 has the operation interface 118 and the memory card interface 128, and in another embodiment of the present invention, the function module 148 of the expansion module 140 has the memory card interface 128, the charging circuit 137, the battery 138, and the input port 119.

Figure 6:
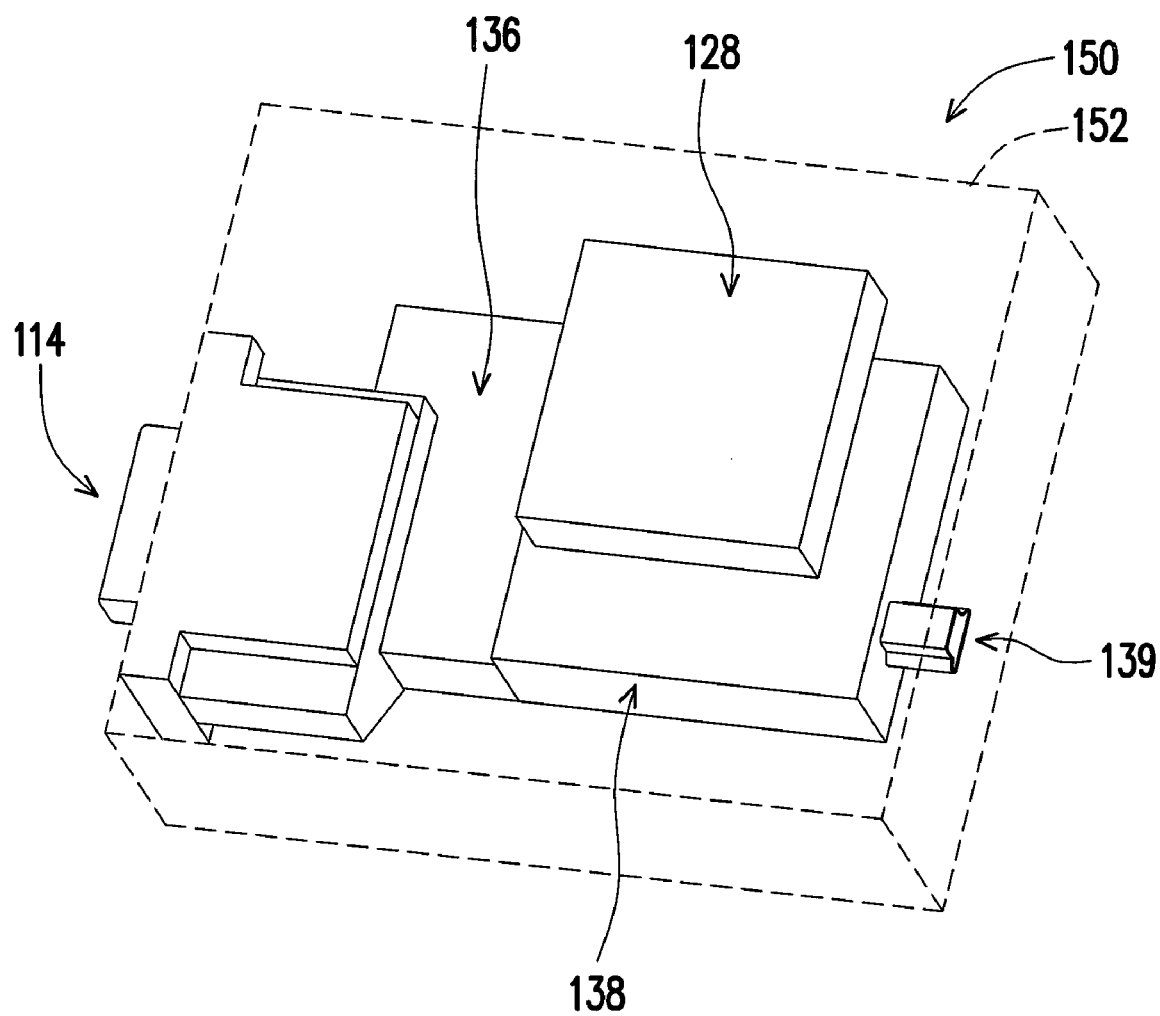
FIG. 6 is a perspective view of an expansion module according to an embodiment of the present invention.
Figure 7:
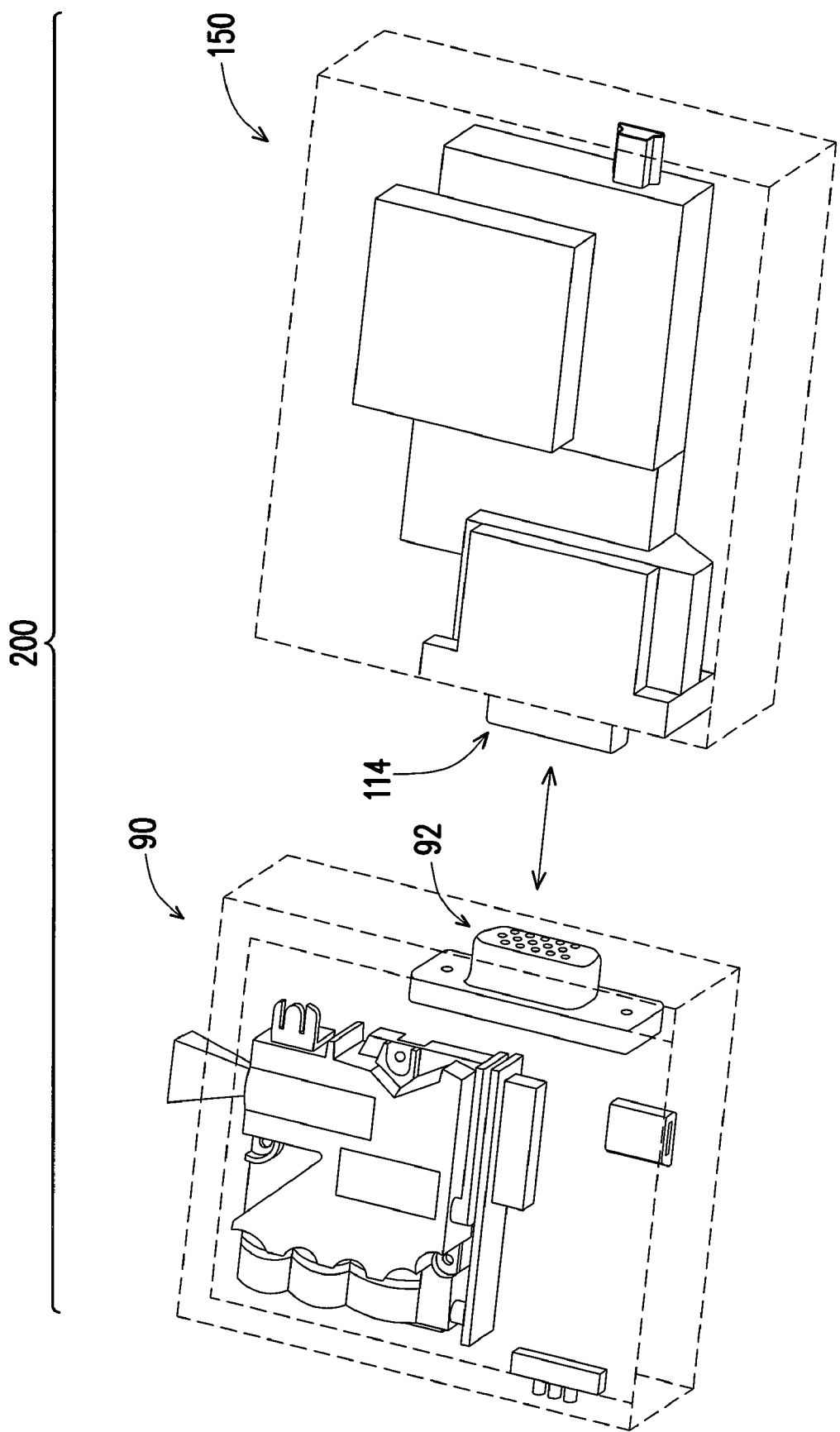
FIG. 7 is a schematic view showing the combination of the pico projector in FIG. 5 and the expansion module in FIG. 6 into a projection system.
Figure 8:
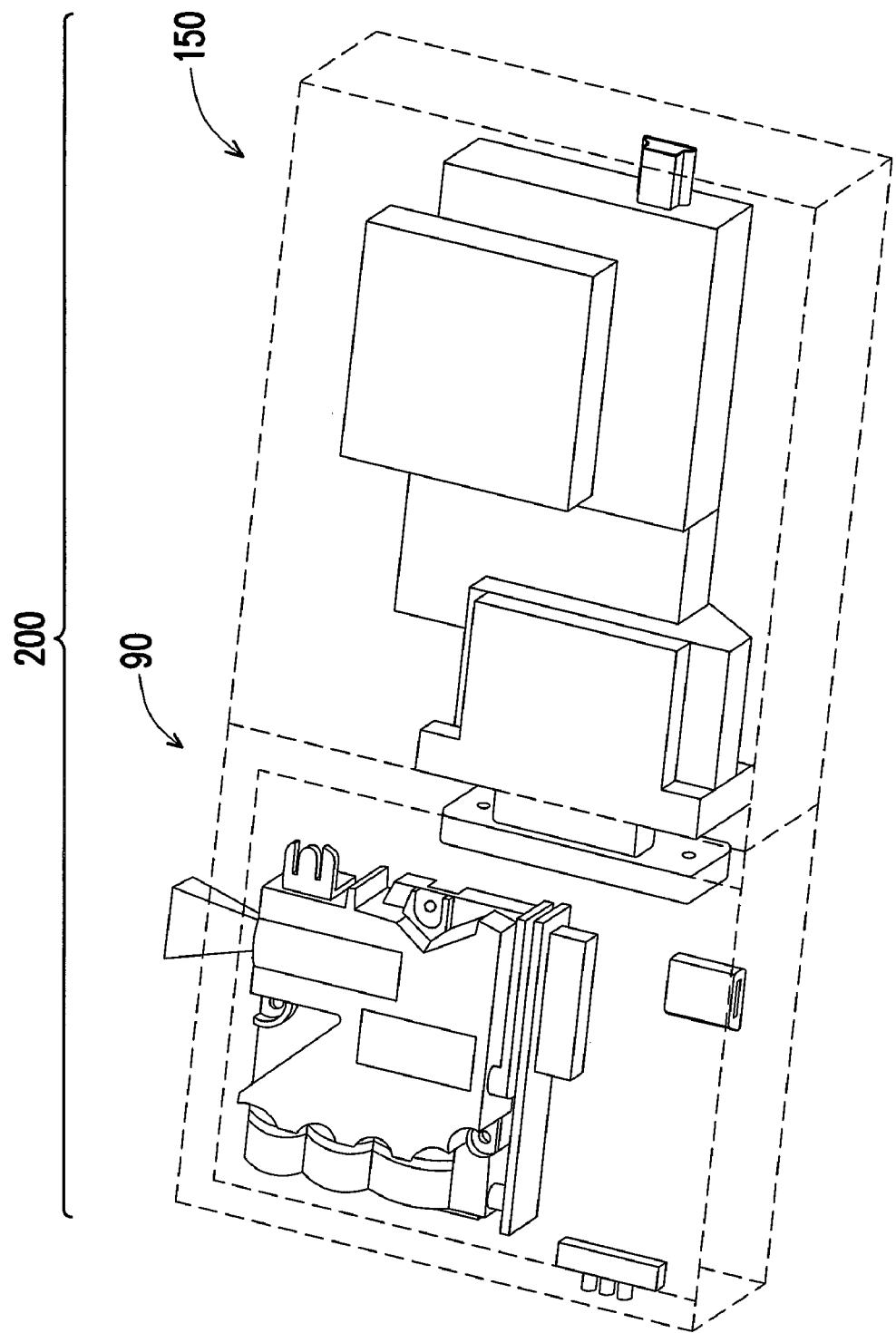
FIG. 8 is a schematic view of the pico projector and the expansion module in FIG. 7 after combination.
Figure 9:
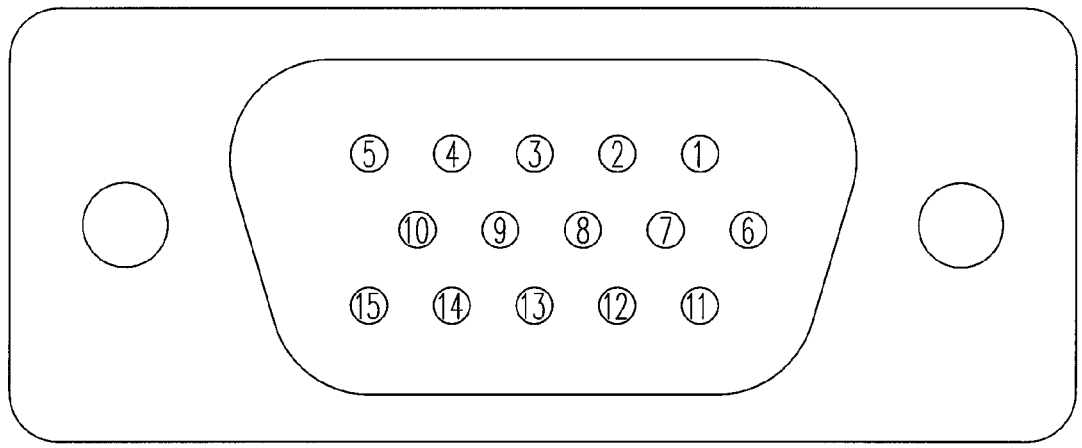
FIG. 9 shows terminals of a connector of a video graphics array interface.

Referring to FIGS. 6 to 8, FIG. 6 is a perspective view of an expansion module 150 according to an embodiment of the present invention, FIG. 7 is a schematic view showing the combination of the pico projector 90 and the expansion module 150 into a projection system 200, and FIG. 8 is a schematic view of the pico projector 90 and the expansion module 150 after combination. As shown in FIG. 6, the expansion module 150 includes a housing 152, the output port 114, the memory card interface 128, the logic circuit 136, the battery 138, and the power supply input interface 139. The output port 114 and the power supply input interface 139 are disposed on two sides of the housing 152 respectively, and the memory card interface 128, the logic circuit 136, and the battery 138 are disposed in the housing 152. The description of the output port 114, the memory card interface 128, the logic circuit 136, the battery 138, and the power supply input interface 139 are mentioned hereinbefore and will not be repeated herein. As shown in FIGS. 7 and 8, the expansion module 150 is connected to the first input port 92 and fixed on one side of the pico projector 90 in a pluggable manner via the output port 114, and after connection, the expansion module 150 and the pico projector 90 form the projection system 200. Therefore, the function of the pico projector 90 may be expanded by the expansion module 150, so as to improve the practicability of the pico projector 90.

Figure 10:
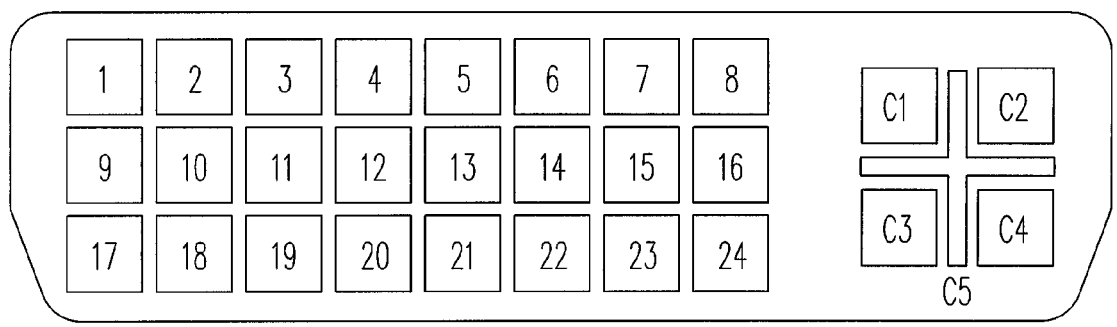
FIG. 10 shows terminals of a connector of a digital visual interface.
Figure 11:
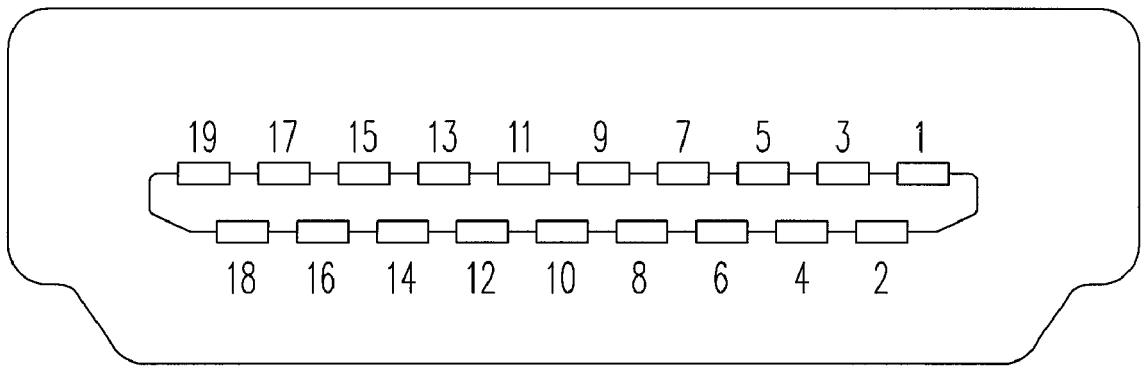
FIG. 11 shows terminals of a connector of a high-definition multimedia interface.
Figure 12:
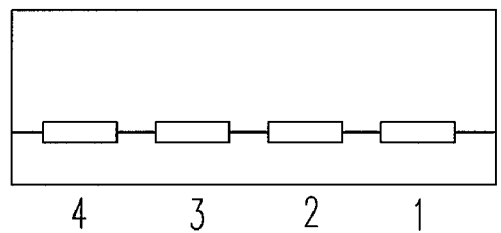
FIGS. 12 to 15 show terminals of connectors of universal serial buses interface of Type A, mini-A, Type B, and mini-B.
Figure 13:
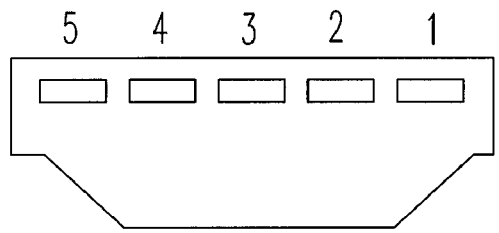
Figure 14:
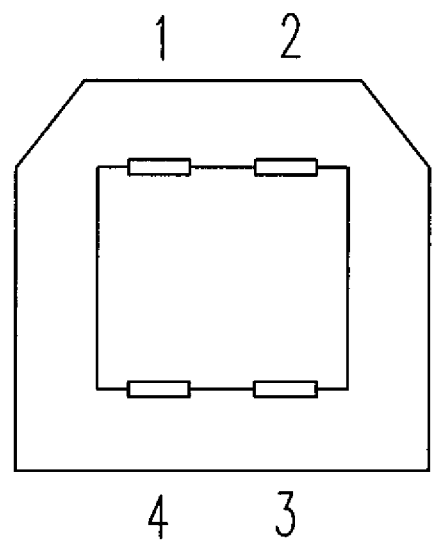
Figure 15:
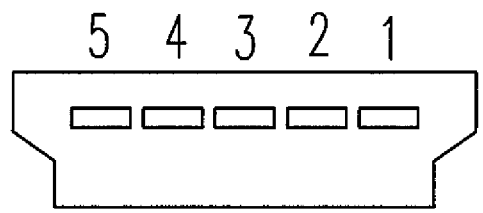

In order to illustrate that the output port 114 in FIG. 4 is capable of providing electrical power to the pico projector 90, the power supply input interface 139 may be a video input interface and may receive external power, and FIGS. 9 to 15 are described for exemplification. First, as described in the above, the output port 114 or the power supply input interface 139 may be a VGA interface, a DVI, a USB interface, and an HDMI for providing electrical power and transferring video. The connector of the VGA interface in FIG. 9 has terminals 1-15, wherein the terminal 5 serves as a ground terminal, the terminal 9 provides a voltage of +5 volt, and the other terminals transfer the video and control the signal. FIG. 10 shows a connector of a DVI having terminals 1-24 and C1-C5, wherein the terminal 14 provides a voltage of +5 volt, the terminal 15 serves as a ground terminal, and the other terminals transfer the video and control the signal. It should be noted that, the DVI has several specifications, for example, DVI-D, DVI-V, DVI-I, and each DVI specification has a +5 volt voltage terminal and a ground terminal. FIG. 11 shows a connector of an HDMI having terminals 1 to 19, wherein the terminal 17 serves as a ground terminal, the terminal 18 provides a voltage of +5 volt, and the other terminals transfer the video and control the signal. Furthermore, FIGS. 12 to 15 show the connectors of USB interfaces of Type A, mini-A, Type B, and mini-B. The connectors of the USB interfaces of Type A and Type B in FIGS. 12 and 14 have terminals 1-4, wherein the terminal 1 provides a voltage of +5 volt, the terminal 4 serves as a ground terminal, and the terminals 2 and 3 transfer the data. The connectors of the USB interfaces of mini-A and mini-B in FIGS. 13 and 15 have terminals 1-5, wherein the terminal 1 provides a voltage of +5 volt, the terminal 5 serves as a ground terminal, the terminals 2 and 3 transfer the data, and the terminal 4 is used for identification.

In view of the above, in the embodiments of the present invention, as various expansion modules are included, consumers may select an expansion module having the video input interface that matches the video output interface from various expansion modules according to the video output interface of the video device, and connects the expansion module to the pico projector. Therefore, the same pico projector may be connected with different video output interfaces according to the demands of the consumers, so as to improve the practicability of the pico projector. Besides, when the expansion module is fixed on one side of the pico projector in a pluggable manner via the output port, the expansion module and the pico projector may be connected without any additional cable, such that both the overall appearance and portability are improved. Furthermore, as the pico projector may work together with various expansion modules, the consumers may select the pico projector according to the preference for the appearance of the pico projector, and when expanding the function of the pico projector, merely a suitable expansion module is required. On the other hand, for manufacturers of the pico projector, various types of pico projectors to be manufactured may have a unified or universal video input interface, and when changing or upgrading the components inside the pico projector, it is unnecessary to change the appearance and mechanism design, and it is not required for the manufacturer to modify the mold, such that manufacturers would manufacture the pico projector immediately to seize the opportunity of business. At the same time, the maintenance and the production are convenient with lowered cost. Moreover, in order to make the pico projector smaller and portable, the pico projector may remain an optical engine and a single video input interface, and the video input interfaces of other specifications or other components (such as the battery) may be modularized into expansion modules, and the expansion modules are connected to the pico projector if necessary. Therefore, the demands for functional diversity and appearance downsizing of the pico projector are achieved simultaneously.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An expansion module, adapted to a projector, comprising:

a housing, a logic circuit, and an output port, wherein the logic circuit is disposed in the housing for controlling an operation of the expansion module, the output port is disposed in the housing and coupled to the logic circuit, the output port is connected to an input port disposed in the housing of the projector, the output port is capable of outputting a first signal to the input port, such that the projector is capable of generating an image and is capable of projecting the image according to the first signal, the output port of the expansion module is fixed to the input port of the projector in a pluggable manner, and a specification of the output port of the expansion module and a specification of the input port of the projector are matched, such that the expansion module and the projector are able to connect with each other in the pluggable manner, wherein the expansion module further comprises a battery, adapted to provide electrical power for the projector via the output port of the expansion module and the input port of the projector.

2. The expansion module according to claim 1, wherein the output port of the expansion module is selected from the group comprising a video graphics array interface, a digital visual interface, a universal serial bus interface, a digital video broadcasting interface, and a high-definition multimedia interface.

3. The expansion module according to claim 1, further comprising an input port, adapted to receive a second signal, wherein a specification of the input port of the expansion module is different from the specification of the input port of the projector, and the logic circuit of the expansion module is capable of converting the second signal into the first signal.

4. The expansion module according to claim 3, wherein the input port of the expansion module is selected from the group comprising a video graphics array interface, a digital visual interface, a universal serial bus interface, a digital video broadcasting interface, and a high-definition multimedia interface.

5. The expansion module according to claim 1, further comprising a charging circuit, adapted to be connected to an external power supply, for charging the battery.

6. The expansion module according to claim 1, further comprising a memory card interface, connected to a memory card, wherein the logic circuit is capable of reading the data stored in the memory card via the memory card interface, and the logic circuit is capable of converting the data stored in the memory card into the first signal.

7. The expansion module according to claim 1, further comprising an operation interface, adapted to be manipulated by a user to change an operation mode of the expansion module.

8. A projection system, comprising:
a projector, comprising a housing and an input port, wherein the input port of the projector is disposed in the housing of the projector; and
an expansion module, comprising:
  a housing;
  a logic circuit, disposed in the housing of the expansion module, for controlling an operation of the expansion module; and
  an output port, disposed in the housing of the expansion module, coupled to the logic circuit, and connected to the input port of the projector, for outputting a first signal to the input port, such that the projector is capable of generating an image and is capable of projecting the image according to the first signal,
wherein the output port of the expansion module is fixed to the input port of the projector in a pluggable manner, and a specification of the output port of the expansion module and a specification of the input port of the projector are matched, such that the expansion module and the projector are able to connect with each other in the pluggable manner,
wherein the expansion module further comprises a battery, adapted to provide electrical power for the projector via the output port of the expansion module and the input port of the projector.

9. The projection system according to claim 8, wherein the output port of the expansion module is selected from the group comprising a video graphics array interface, a digital visual interface, a universal serial bus interface, a digital video broadcasting interface, and a high-definition multimedia interface.

10. The projection system according to claim 9, wherein the input port of the projector is a video graphics array interface.

11. The projection system according to claim 8, wherein the expansion module further comprises an input port, adapted to receive a second signal, wherein a specification of the input port of the expansion module is different from the specification of the input port of the projector, and the logic circuit of the expansion module is capable of converting the second signal into the first signal.

12. The projection system according to claim 11, wherein the input port of the expansion module is selected from the group comprising a video graphics array interface, a digital visual interface, a universal serial bus interface, a digital video broadcasting interface, and a high-definition multimedia interface.

13. The projection system according to claim 8, wherein the expansion module further comprises a charging circuit, adapted to be connected to an external power supply, for charging the battery.

14. The projection system according to claim 8, wherein the expansion module further comprises a memory card interface, connected to a memory card, wherein the logic circuit is capable of reading data stored in the memory card via the memory card interface, and the logic circuit is capable of converting the data stored in the memory card into the first signal.

15. The projection system according to claim 8, wherein the expansion module further comprises an operation interface, adapted to be manipulated by a user to change an operation mode of the expansion module.

* * * * *